(12) United States Patent
Mayer et al.

(10) Patent No.: US 10,724,436 B2
(45) Date of Patent: Jul. 28, 2020

(54) INLET PARTICLE SEPARATOR FOR A TURBINE ENGINE

(71) Applicant: General Electric Company, Schenectady, NY (US)

(72) Inventors: Jeffrey Carl Mayer, Swampscott, MA (US); Apostolos Pavlos Karafillis, Winchester, MA (US); John Alan Manteiga, North Andover, MA (US); Courtney Ann Kiszewski, Ipswich, MA (US); Kyle Earl Roland Henry, Seabrook, NH (US); Craig Douglas Young, Blanchester, OH (US)

(73) Assignee: General Electric Company, Schenectady, NY (US)

( * ) Notice: Subject to any disclaimer, the term of this patent is extended or adjusted under 35 U.S.C. 154(b) by 599 days.

(21) Appl. No.: 15/002,839

(22) Filed: Jan. 21, 2016

(65) Prior Publication Data
US 2017/0211475 A1    Jul. 27, 2017

(51) Int. Cl.
| | |
|---|---|
| *F02C 7/052* | (2006.01) |
| *B01D 45/08* | (2006.01) |
| *F02C 7/055* | (2006.01) |
| *B01D 45/00* | (2006.01) |
| *B01D 45/06* | (2006.01) |
| *B01D 45/16* | (2006.01) |

(52) U.S. Cl.
CPC .............. *F02C 7/052* (2013.01); *B01D 45/00* (2013.01); *B01D 45/06* (2013.01); *B01D 45/08* (2013.01); *F02C 7/055* (2013.01); *B01D 45/16* (2013.01); *F05D 2260/607* (2013.01); *Y02T 50/671* (2013.01)

(58) Field of Classification Search
CPC .. F02C 7/05; F02C 7/052; F02C 7/055; F05D 2260/607; B01D 45/08; B01D 45/12; B01D 45/14; B01D 45/16; B01D 45/06; B01D 45/00
See application file for complete search history.

(56) References Cited

U.S. PATENT DOCUMENTS

| | | |
|---|---|---|
| 3,066,912 A | 12/1962 | Scheper, Jr. |
| 3,073,377 A | 1/1963 | Robinson |
| 3,309,867 A | 3/1967 | Franklin |
| 3,368,332 A | 2/1968 | Hooper et al. |
| 3,521,431 A | 7/1970 | Connors et al. |

(Continued)

OTHER PUBLICATIONS

John Alan Manteiga et al., Jul. 20, 2016, U.S. Appl. No. 15/215,345.
(Continued)

*Primary Examiner* — Todd E Manahan
*Assistant Examiner* — Thuyhang N Nguyen
(74) *Attorney, Agent, or Firm* — McGarry Bair PC

(57) ABSTRACT

A method and apparatus for separating particles from an inlet airflow of a turbine engine has a centerbody with a radially outer scavenge conduit. The inlet airflow has entrained particulate matter, which can impact an impact surface defining part of the centerbody. The impact surface can be disposed at an angle or have a low coefficient of restitution to reduce the velocity of the incoming particulate matter. The particulate matter is radially diverted radially outward through the scavenge conduit, unable to make a turn defined by the shape of the centerbody.

20 Claims, 6 Drawing Sheets

(56) References Cited

U.S. PATENT DOCUMENTS

| | | | |
|---|---|---|---|
| 3,534,548 | A | 10/1970 | Connors |
| 3,733,814 | A | 5/1973 | Hull et al. |
| 3,832,086 | A | 8/1974 | Hull et al. |
| 3,892,612 | A | 7/1975 | Carlson et al. |
| 3,952,972 | A | 4/1976 | Tedstone et al. |
| 3,979,903 | A | 9/1976 | Hull, Jr. et al. |
| 3,993,463 | A | 11/1976 | Barr |
| 4,158,449 | A | 6/1979 | Sun et al. |
| 4,289,611 | A | 9/1981 | Brockmann |
| 4,309,147 | A | 1/1982 | Koster et al. |
| 4,527,387 | A * | 7/1985 | Lastrina .................. F02C 7/052 244/53 B |
| 4,617,028 | A | 10/1986 | Ray et al. |
| 4,622,050 | A | 11/1986 | O'Connor |
| 4,702,071 | A * | 10/1987 | Jenkins .................. F02C 7/052 415/121.2 |
| 4,798,047 | A | 1/1989 | Geary |
| 4,901,520 | A | 2/1990 | Kozak et al. |
| 4,928,480 | A | 5/1990 | Oliver et al. |
| 5,039,317 | A | 8/1991 | Thompson et al. |
| 5,165,236 | A | 11/1992 | Nieminen |
| 5,294,410 | A | 3/1994 | White |
| 5,464,479 | A | 11/1995 | Kenton et al. |
| 5,918,458 | A | 7/1999 | Coffinberry et al. |
| 6,698,180 | B2 | 3/2004 | Snyder |
| 6,702,873 | B2 | 3/2004 | Hartman |
| 7,284,953 | B2 | 10/2007 | Silverman et al. |
| 7,695,243 | B2 | 4/2010 | Lee et al. |
| 7,777,155 | B2 | 8/2010 | Twelves, Jr. et al. |
| 7,854,778 | B2 | 12/2010 | Groom et al. |
| 7,931,740 | B2 | 4/2011 | Al-Alusi et al. |
| 8,092,145 | B2 | 1/2012 | Martel et al. |
| 8,256,277 | B2 | 9/2012 | Khibnik et al. |
| 8,469,309 | B2 | 6/2013 | Stuart et al. |
| 8,506,836 | B2 | 8/2013 | Szuromi et al. |
| 8,561,411 | B2 | 10/2013 | Dibenedetto |
| 8,663,350 | B2 | 3/2014 | Snyder |
| 8,668,442 | B2 | 3/2014 | Morris et al. |
| 9,046,056 | B2 | 6/2015 | Lerg |
| 9,394,827 | B2 * | 7/2016 | Judd .................. F02C 7/05 |
| 2013/0323473 | A1 | 12/2013 | Dietsch et al. |
| 2014/0119891 | A1 | 5/2014 | Schmittenberg et al. |
| 2014/0182292 | A1 | 7/2014 | Hudon et al. |
| 2014/0237954 | A1 | 8/2014 | Snyder |
| 2014/0241850 | A1 | 8/2014 | Duge |
| 2014/0286790 | A1 | 9/2014 | Molter et al. |
| 2014/0290254 | A1 | 10/2014 | Manning et al. |
| 2015/0040535 | A1 | 2/2015 | Judd et al. |
| 2015/0052872 | A1 | 2/2015 | Zurmehly et al. |
| 2016/0177824 | A1* | 6/2016 | Ponton .................. F02C 7/052 60/779 |
| 2017/0363000 | A1 | 12/2017 | Kiszewski |
| 2018/0023473 | A1 | 1/2018 | Manteiga et al. |

OTHER PUBLICATIONS

Courtney Ann Kiszewski, Jun. 15, 2016, U.S. Appl. No. 15/182,730.
Extended European Search Report and Opinion issued in connection with corresponding EP Application No. 16199202.9 dated Jun. 9, 2017.
Office Action issued in connection with corresponding CA Application No. 2948980 dated Oct. 17, 2017.
Machine Translation and Second Office Action and Search issued in connection with corresponding CN Application No. 201611021756.X dated Oct. 31, 2018.

* cited by examiner

INLET PARTICLE SEPARATOR FOR A TURBINE ENGINE

STATEMENT REGARDING FEDERALLY SPONSORED RESEARCH OR DEVELOPMENT

This invention was made with government support under Contract No. W911W6-07-02-0002 awarded by the United States Government. The United States Government has certain rights in this invention.

BACKGROUND OF THE INVENTION

Engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation. Additionally, fluidic systems where the flow of dirty fluid, such as containing particulate matter, can include a downstream engine, such as in a tank or power plant.

Gas turbine engines for aircraft are designed to operate at high temperatures to maximize engine efficiency, so cooling of certain engine components, such as the high pressure turbine and the low pressure turbine, can be necessary. Typically, cooling is accomplished by ducting cooler air from the high and/or low pressure compressors to the engine components that require cooling. While the turbine air is a high temperature, it is cooler relative to the compressor air, and can be used to cool the turbine. When cooling the turbines, cooling air can be supplied to various turbine components, including the interior of the turbine blades and the turbine shroud.

Particles, such as dirt, dust, sand, volcanic ash, and other environmental contaminants in the engine intake air can cause sever compressor erosion. As the particles move through the engine they can melt in the combustion gases and subsequently resolidify on the turbine flow path surfaces. Particles entrained in the turbine cooling air can cause a loss of cooling due to deposition and plugging of the cooling passages. All of these effects cause reduced operational time or "time-on-wing" for the aircraft environment. This problem is exacerbated in certain operating environments around the globe where turbine engines are exposed to significant amounts of airborne particles.

BRIEF DESCRIPTION OF THE INVENTION

In one aspect, a method of separating particles from an inlet airflow of a turbine engine having a centerbody and defining an engine centerline. The method comprising impacting at least a portion of the inlet airflow against an impact surface, after impacting, turning the airflow about the centerbody, and radially diverting a portion of the airflow relative to the engine centerline during the turning to form a scavenge flow containing inertially bound particles incapable of making the turn.

In another aspect, a gas turbine engine comprising an inlet having a centerbody and defining an inlet duct defining an inlet airflow path, an engine core arranged downstream of the centerbody and defining an engine centerline, and an inlet particle separator having a scavenge plenum arranged radially outwardly about at least a portion of the centerbody and having a plenum inlet fluidly coupling the inlet duct to the scavenge plenum.

In yet another aspect, a gas turbine engine having a centerbody and defining an inlet duct defining an inlet airflow path, an engine core arranged downstream of the centerbody and defining an engine centerline, an inlet particle separator having a scavenge plenum arranged radially outwardly and forming a turn about at least a portion of the centerbody and having a plenum inlet fluidly coupling the inlet duct to the scavenge plenum, and an impact surface formed by at least a portion of the centerbody located upstream of the turn.

DESCRIPTION OF EMBODIMENTS OF THE INVENTION

Figure 1:
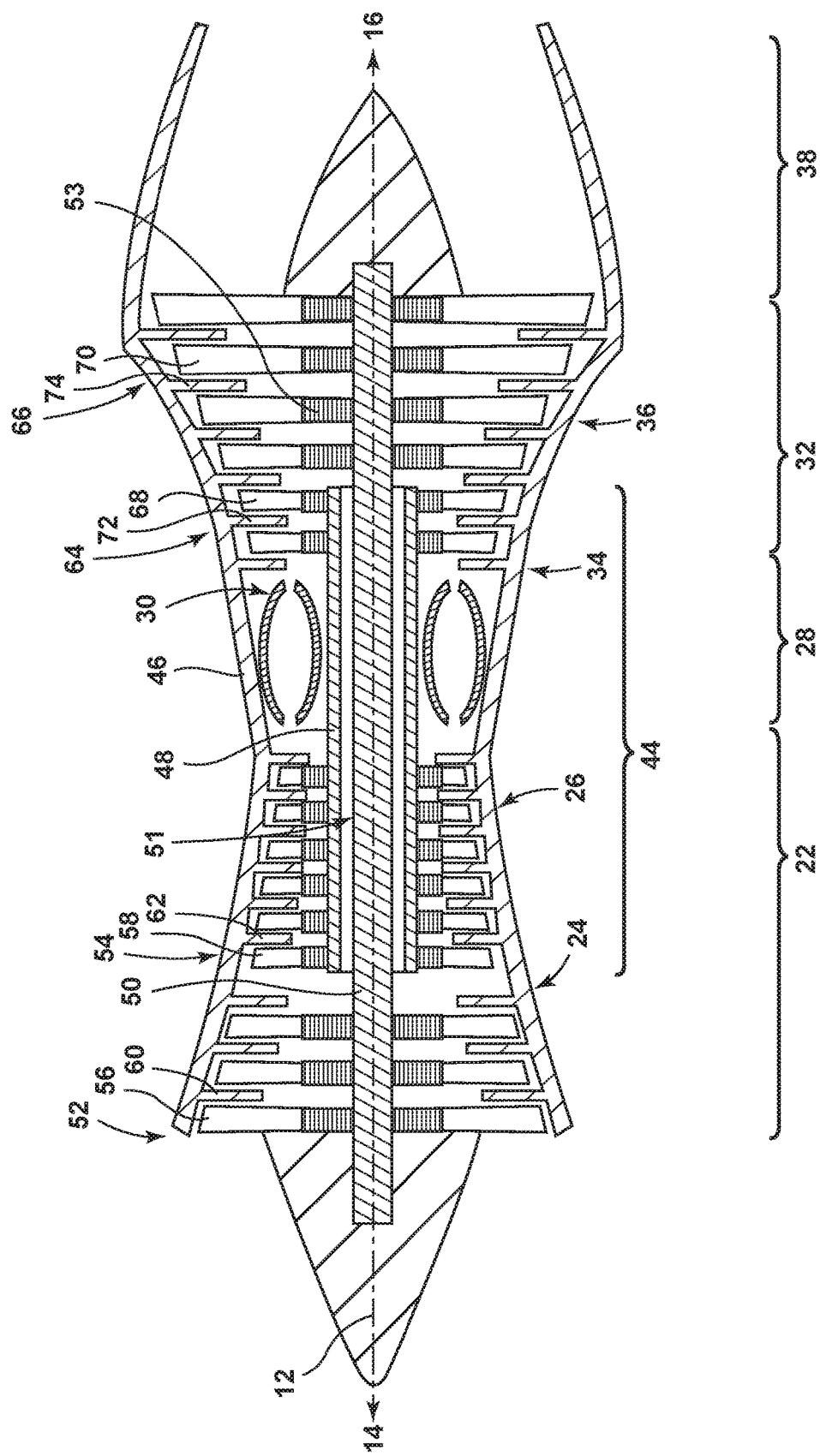
FIG. 1 is a schematic, sectional view of a gas turbine engine.

The described embodiments of the present invention are directed to systems, methods, and other devices related to particle removal, particularly in a turbo shaft turbine engine, and more particularly to the removal of particles from the engine intake airflow to a turbine engine. For purposes of illustration, the present invention will be described with respect to an aircraft gas turbine engine. It will be understood, however, that the invention is not so limited and can have general applicability in non-aircraft applications, such as other mobile applications and non-mobile industrial, commercial, and residential applications.

As used herein, the terms "axial" or "axially" refer to a dimension along a longitudinal axis of an engine or along a longitudinal axis of a component disposed within the engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine centerline.

As used herein, the terms "radial" or "radially" refer to a dimension extending between a center longitudinal axis of the engine, an outer engine circumference, or a circular or annular component disposed within the engine. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

As used herein, the terms "tangential" or "tangentially" refer to a dimension extending perpendicular to a radial line with respect to the longitudinal axis of the engine or the longitudinal axis of a component disposed therein.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38. The HP compressor 26, the combustor 30, and the HP turbine 34 form a core 44 of the engine 10, which generates combustion gases. The core casing 46 surrounds the core 44.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24. The portions of the engine 10 mounted to and rotating with either or both of the spools 48, 50 are referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can mount to a disk 53, which mounts to the corresponding one of the HP and LP spools 48, 50, with each stage having its own disk. The vanes 60, 62 mount to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, air is supplied to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the LP compressor 24.

Some of the ambient air can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
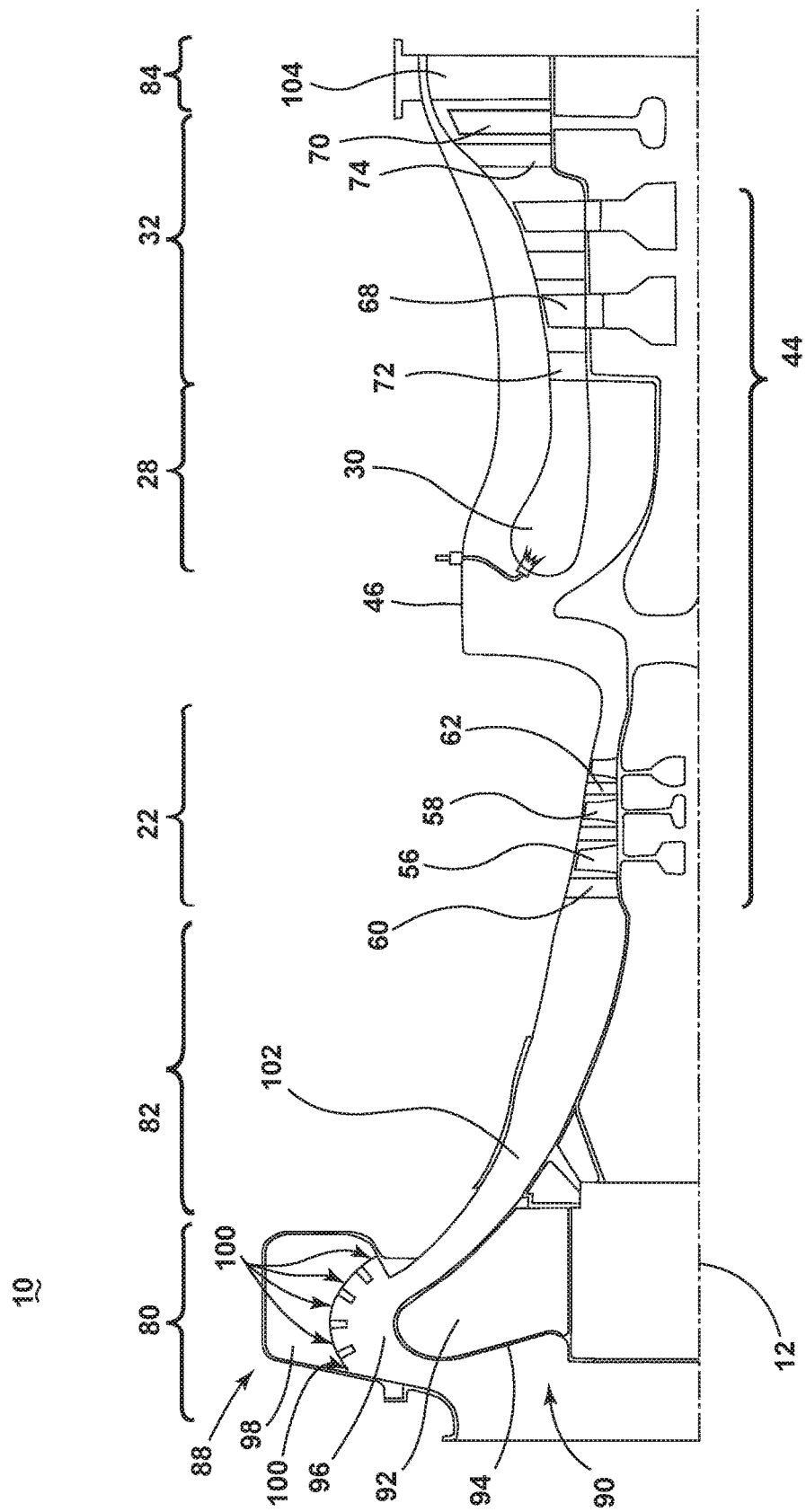
FIG. 2 is a cross-sectional view of the gas turbine engine of FIG. 1 having an inlet particle separator.

Referring to FIG. 2, a cross-section of the gas turbine engine 10 illustrates an inlet section 80 and a conduit section 82 in axial arrangement upstream of the compressor section 22, and an outlet section 84 downstream of the turbine section 32. The inlet section 80 has an inlet particle separator 88 having an inlet 90, a centerbody 92, and a scavenge plenum 98. The inlet 90 defines an opening for providing a flow of air to the downstream sections. Axially downstream of the inlet 90 is the centerbody 92 having an impact surface 94 formed by a portion of the centerbody 92, confronting a flow of air provided from the inlet 90. An inlet duct 96 is defined about the centerbody 92 and radially, outwardly bounded by the scavenge plenum 98 in fluid communication with the inlet duct 96. One or more plenum inlets 100 provide fluid communication between the inlet duct 96 and the scavenge plenum 98. The inlet 90, centerbody 92, and the scavenge plenum 98 are all annular, such that the inlet duct 96 is radially defined around the engine centerline 12. It is contemplated that the scavenge plenum 98 can alternatively comprise other scrolls, scavenge conduits, or can be a combination of multiple scavenge conduits arranged radially about the engine centerline 12.

The conduit section 82 has a flow conduit 102 fluidly coupling the inlet duct 96 to the compressor section 22 of the engine 10. The flow of air provided to the inlet 90 can pass around the centerbody 92 through the inlet duct 96 and to the flow conduit 102, providing air to the compressor section 22. The outlet section 84 has one or more struts 104 arranged radially around the engine centerline 12.

Figure 3:
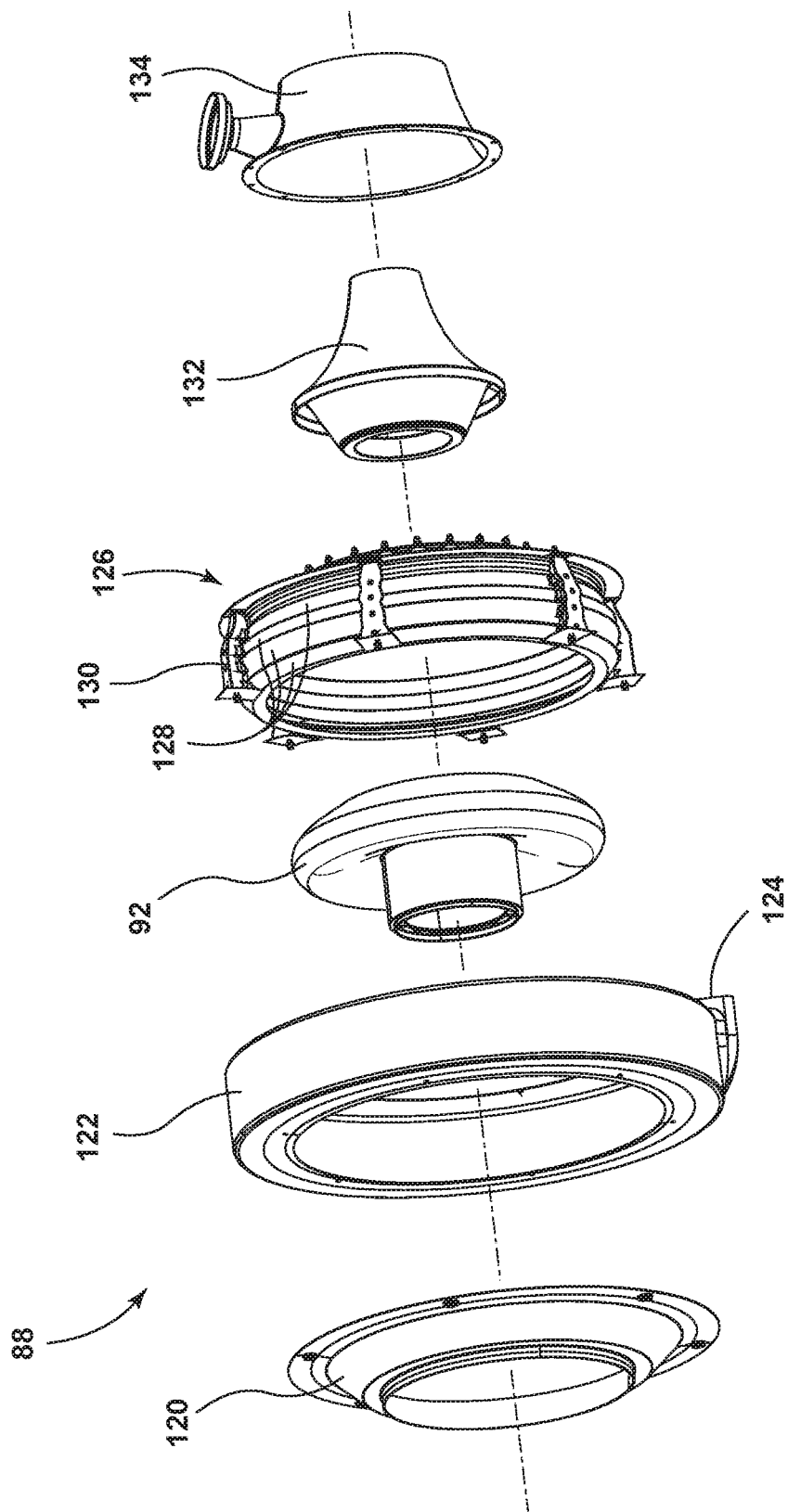
FIG. 3 is an exploded view of the inlet particle separator of FIG. 3.

Turning to FIG. 3, an exploded view of the inlet particle separator 88, best illustrating the combination of the components for providing an airflow to the engine core 44. A front plate 120 mounts to a scavenge conduit 122, defining the scavenge plenum 98. The front plate 120 and centerbody 92 for the radially outward flowing inlet to the turn 96. Particles are accelerated in a radially outward direction for scavenging through the plenum inlets 100. The scavenge conduit 122 has a scavenge outlet 124 for providing a scavenge flow of air overboard. Radially within the scavenge conduit 122 is the centerbody 92. A scavenge inlet section 126 can comprise a plurality of annular scavenge vanes 128 mounted to one or more bands 130 to define the plenum inlets 100 of FIG. 2. The scavenge vanes 128 comprise wedge-shaped bodies oriented to define a radial disposition of the plenum inlets 100 is radial. Alternatively, it is contemplated that the scavenge vanes 128 can be any shape, such that the wedge-shape is non-limiting. Furthermore, the disposition of the scavenge vanes 128 can define an axial orientation for the plenum inlets 100. While four scavenge vanes 128 are shown, any number of scavenge vanes 128 is contemplated to define any number of plenum inlets 100. An inner member 132 and an outer member 134 can define the radially inner and outer bounds of the flow conduit 102 axially downstream of the centerbody 92. The centerbody 92 and the inner member can couple in axial arrangement, being supported within the outer arrangement of the scavenge conduit 122 and the scavenge inlet section 126.

The structural elements of the inlet particle separator 88 are easily interconnectable to form the inlet particle separator 88. The inlet particle separator 88 can be mechanically removable from the conduit section 82. Installation and maintenance of the inlet section 80 is facilitated with easy of removability. It should be understood, however, that differing manufacturing combinations are possible to develop the apparatus disclosed herein.

Figure 4:
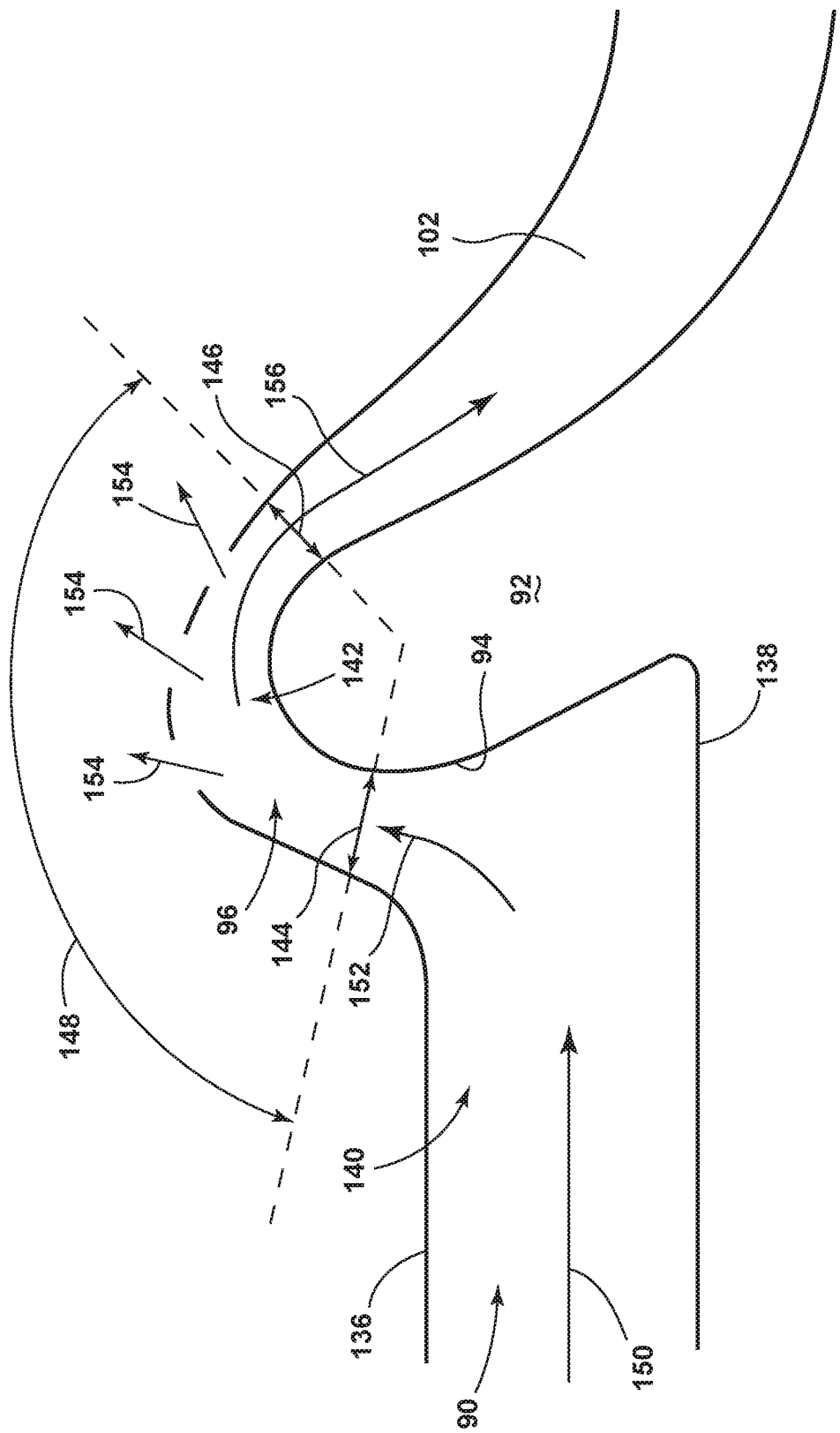
FIG. 4 is a sectional view of the inlet particle separator illustrating the airflow therein.

FIG. 4 illustrates a cross-section of the inlet duct 96 of the inlet particle separator 88, best illustrating radially outer 136 and inner 138 surfaces defining the inlet 90, the inlet duct 96, and the flow conduit 102 to define a flow path 140. The inlet duct 96 further defines a turn 142 about the centerbody 92, having the impact surface 94 upstream of the inlet duct 96. The plenum inlets 100 fluidly couple to the inlet duct 96 at the turn 142. The inlet duct 96 can further have an inlet 144 and an outlet 146. The inlet 144 can have a minimum cross-sectional area to accelerate the air entering the inlet duct 96. Additionally, the outlet 146 can have a minimum cross-sectional area downstream of the plenum inlets 100, such that an airflow entering the flow conduit 102 decelerates before moving to the compressor section 22. The turn 142 can be defined between the inlet 144 and the outlet 146 and can comprise a turn angle 148 of at least 120 degrees, while a turn having any angle is contemplated. The turn 142 can couple to the plenum inlets 100 at an apex of the turn 142. The plenum inlets 100 as shown can be disposed in a manner complementary to the flow within the turn 142. For example, if the centerbody 92 defines a particular angle for the turn 142 relative to the engine centerline 12, the plenum inlet 100 at that portion of the turn 142 can be angled relative to or complementary to the turn 142 to prevent negative impact to the engine performance. Furthermore, more or less plenum inlets 100 can be utilized based upon the particular engine 10 or inlet 90 design.

An inlet flow 150 is provided through the inlet 90, having a substantially axial flow direction. The inlet flow 150 turns to move into the inlet duct 96 in a substantially radially outward direction and accelerates into the turn 142. Particular matter entrained within the inlet flow 150 can turn into the inlet duct 96, or will have a great enough mass, that it will impact the impact surface 94 before moving into the inlet duct 96, reducing the inertia of the particulate matter. A duct airflow 152 will pass through the turn 142, having a portion of the air move into the flow conduit 102, with the other portion of the duct airflow 152 passing through the plenum inlets 100 as a scavenge flow 154. Particulate matter entrained within the duct airflow 152 will have a velocity to define an inertia that will carry a percentage of the particulate matter through the plenum inlets 100 with the scavenge flow 154, removing a percentage of the particulate matter from a cleaner airflow 156 being provided to the compressor section 22 through the flow conduit 102. It should be appreciated that utilizing a substantial turn 142 in combination with an impact surface 94 and radially disposed scavenge conduit 122 can remove a remove a greater portion of particulate matter entering the engine 10, as compared to other inlet particle separators having a smaller turn 142.

Figure 5A:
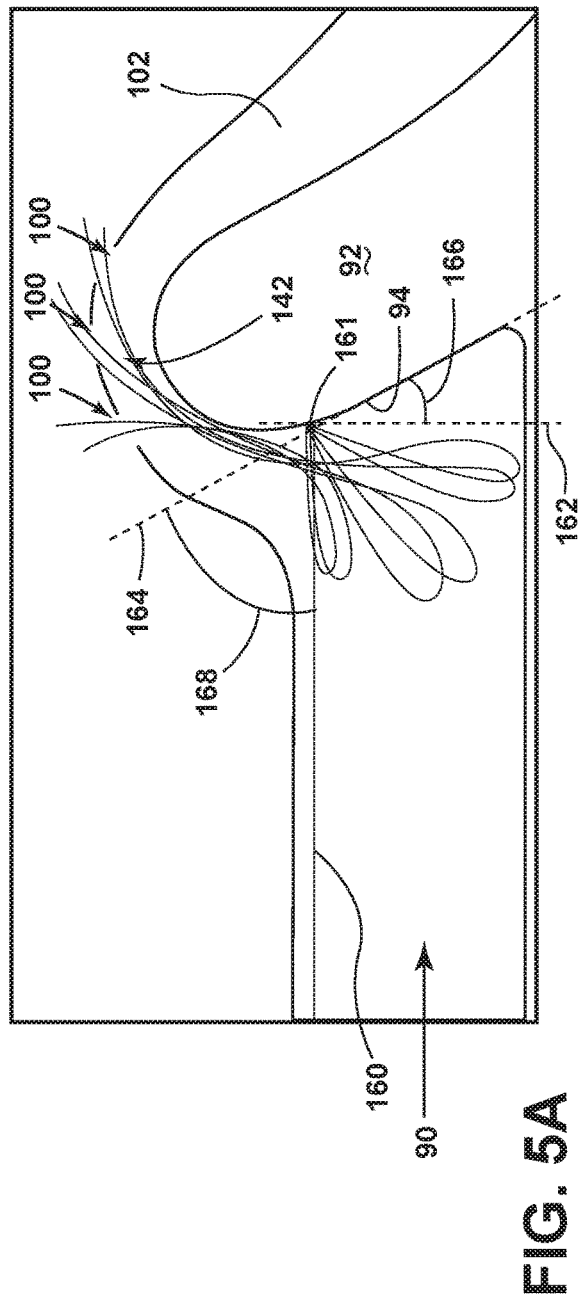
FIG. 5A is a sectional view illustrating particles contacting an impact surface having a nominal coefficient of restitution.
Figure 5B:
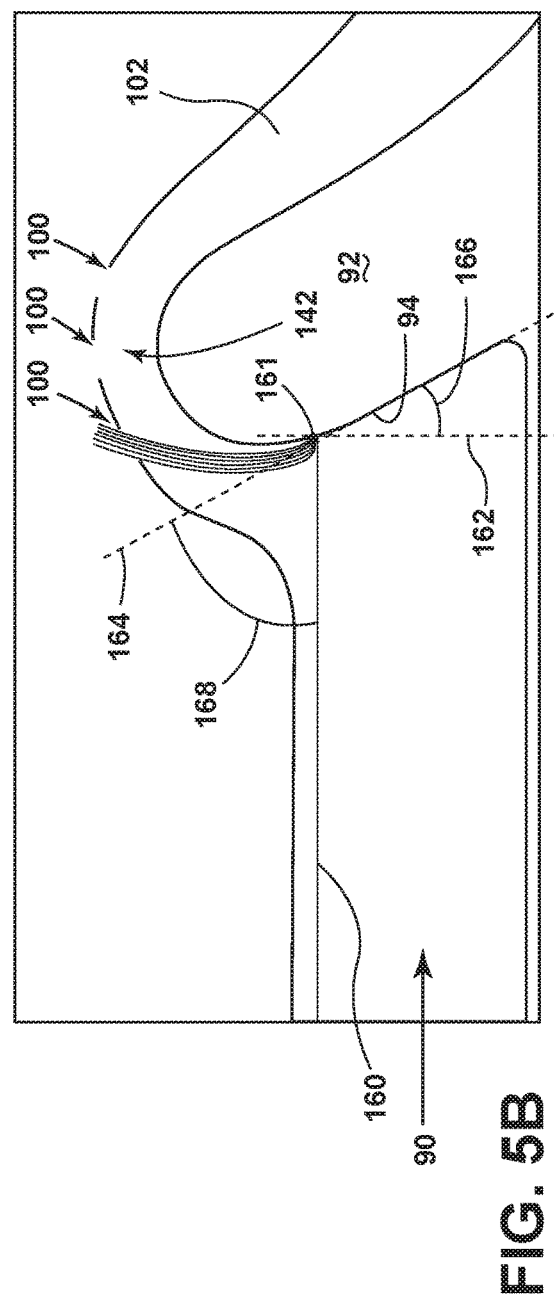
FIG. 5B is a sectional view illustrating particles contacting the impact surface of FIG. 5A having a low coefficient of restitution.

Turning now to FIGS. 5A and 5B, a flow of particulate matter is illustrated impacting the impact surface 94. Looking at FIG. 5A, a stream of particulate matter 160 will move in a substantially axial flow path with a flow of air provided to the engine 10. The impact surface 94 at a contact point 161 of the particulate matter 160 can be disposed at an angle. A radial axis 162 can extend through the contact point 161 orthogonal to the engine centerline 12. An impact axis 164 can be defined along the impact surface 94 through the contact point 161. A first forward angle 166 exists between the radial axis 162 and the impact axis 164 and a second forward angle 168 exists between the impact axis 164 and the axial flow streamline of the particulate matter 160. The centerbody 92 can be shaped such that the impact surface 94 defines the first and second forward angles 166, 168 being 90-degrees or less.

As can be appreciated, the particulate matter 160 will contact the impact surface 94 and can scatter in a plurality of directions before travelling into the inlet duct 96 and entering the turn 142, before having a large portion of the particulate matter 160 pass through the plenum inlets 100. The angles 166, 168 defined by the impact surface 94 can vary to direct the trajectory of the particulate matter or to develop a region of aerodynamic stagnation to slow the particulate matter. The geometry of the impact surface provides an opportunity to rebound the particles into the oncoming inlet airflow 150 and slow the velocity of the particulate matter. Once the particle velocity is considerably reduced, aerodynamic drag will re-accelerate the particle and strongly influence the particle trajectory. After impact, the particle will be reaccelerated largely in a radial direction as It enters inlet 144 and continues in a radially outward direction to the scavenge plenum inlets 100.

Looking at FIG. 5B, the impact surface 94 can have a low coefficient of restitution (CoR), such that the particulate matter 160 impacting the centerbody 92 will impact in an inelastic collision, acting in a less chaotic manner, while decreasing velocity and inertia of the particulate matter. The combination of the angled surface and the low CoR for the surface can result in particles having a significant decrease in velocity relative to their inlet speeds. The low CoR can provide a more direct path for the particulate matter toward the plenum inlets 100, such that less plenum inlets 100 are required or system efficiency can be increased.

Figure 6:
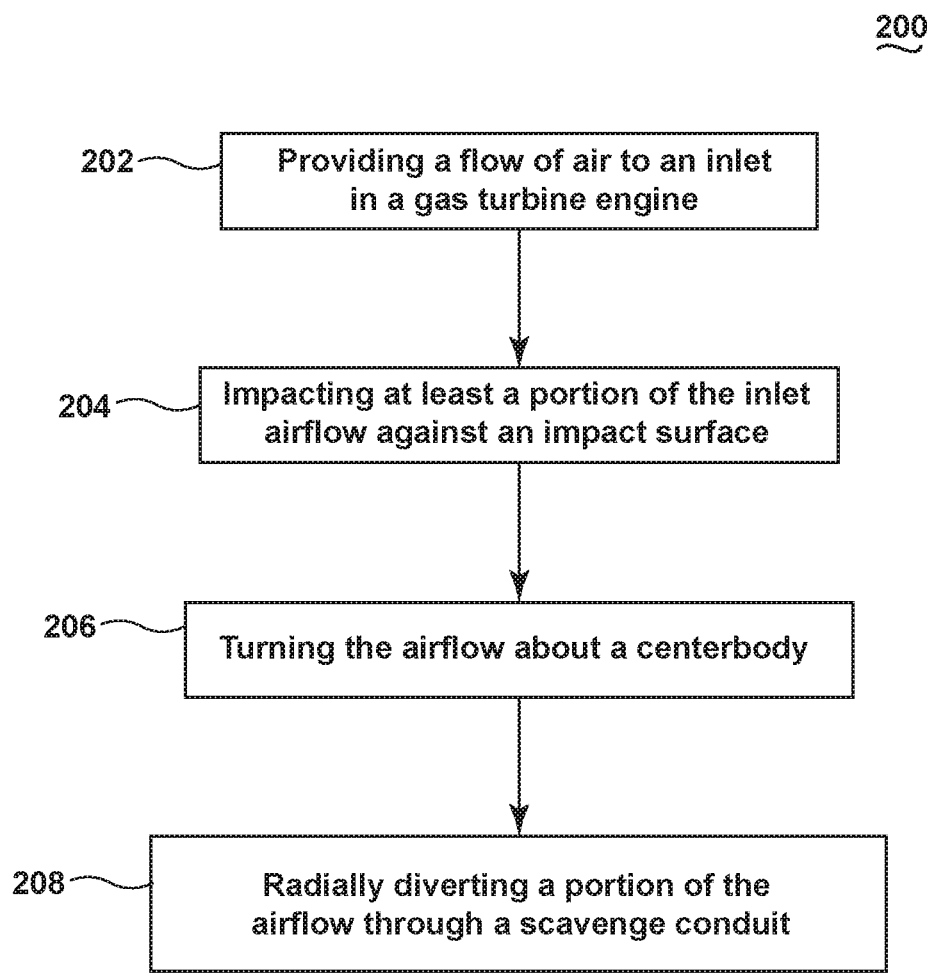
FIG. 6 is a flow chart illustrating a method of separating particles from an inlet airflow of a turbine engine.

FIG. 6 is a flow chart illustrating a method 200 of separating particles from an inlet flow of a turbine engine 10. The turbine engine can define a centerbody and have a centerbody. At 202, a flow of air is provided to the gas turbine engine 10 through an inlet 90. As 204, at least a portion of the airflow impacts against an impact surface 94 on the centerbody 92. Impacting the airflow can comprise impacting the airflow against the impact surface 94 at a forward angle being 90 degrees or less relative to either the engine centerline 12 or the airflow streamline, or both, such that the impact surface 94 forms an acute forward angle. Additionally, the impact surface can have a low CoR, reducing the inertia of the particular matter after impact. The reduced inertia can determine a more directed flow path for the particulate matter after impact. The CoR can result in an inelastic collision of the particles at the impact surface.

After impacting, at 206, the airflow can turn about the centerbody 92. The airflow turns about the centerbody 92. The turn can be greater than 120 degrees, while a turn of any angle is contemplated. The airflow can pass through a minimum cross-sectional area to accelerate the airflow during the turn. At 208, a portion of the airflow is radially diverted, relative to the engine centerline 12, during the turning of the airflow to form a scavenge flow containing inertially bound particles incapable of making the turn. The radially diverted scavenge flow can be diverted at the apex of the turn. A scavenge conduit 122 can have a scavenge plenum 98 for accepting the particle laden scavenge flow and moving the scavenge airflow to another portion of the engine 10 or overboard.

The impacted particles results in the particles scattering in a chaotic manner. Utilizing an impact surface 94 having a low CoR as well as an angled surface reduces the particle velocity, having the particle velocity then dominated by drag and can then direct the particulate matter toward the plenum inlets 100. The direction of the particulate matter can increase the efficiency of the system in removing particles from the airflow moving into the engine 10. Furthermore, direction of the particulate matter can reduce the number of required scavenge vanes 128, reducing size and weight, while simplifying the inlet particle separator 88.

It should be appreciated that the inlet particle separator as described comprising a radially outward entrance for the particle separation and scavenge flow in combination with a substantial flow turn efficiently separates both large and fine particulate matter from the airflow entering the engine. Additionally a forward impact surface with a low coefficient of restitution and an angled surface can decrease particulate matter velocity to increase the amount of particulate matter separated from the airflow.

Moving the scavenge conduit to a radially outbound position also allows for optimum mounting location for the gearbox.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine comprising:
   an inlet having a centerbody defining a radially inward surface of an inlet duct defining an inlet airflow path;
   an engine core arranged downstream of the centerbody and defining an engine centerline; and
   an inlet particle separator having a scavenge plenum arranged about at least a portion of the centerbody and having a set of plenum inlets fluidly coupling the inlet duct to the scavenge plenum;
   wherein the inlet duct defines a turn about the radially inward surface of the centerbody, wherein the set of plenum inlets are spaced along an axial segment and disposed radially outward about an apex of the turn, and wherein the axial segment is defined by the turn and the set of plenum inlets fluidly couple to the inlet duct at the turn.

2. The gas turbine engine of claim 1 wherein the turn is at least 120 degrees.

3. The gas turbine engine of claim 2 further comprising an impact surface upstream of the turn.

4. The gas turbine engine of claim 3 wherein the impact surface is formed by a portion of the centerbody.

5. The gas turbine engine of claim 3 wherein the impact surface defines a forward angle of less than or equal to 90 degrees relative to the centerline.

6. The gas turbine engine of claim 3 wherein the impact surface results in a collision of particulate matter.

7. The gas turbine engine of claim 1 wherein the inlet particle separator comprises scavenge vanes located with the set of plenum inlets.

8. The gas turbine engine of claim 1 wherein the inlet particle separator is mechanically removable from the inlet.

9. The gas turbine engine of claim 1 further comprising an impact surface upstream of the set of plenum inlets.

10. The gas turbine engine of claim 9 wherein the impact surface has a coefficient of restitution resulting in a collision of particulate matter against the impact surface.

11. The gas turbine engine of claim 10 wherein the impact surface defines a forward angle of less than or equal to 90 degrees relative to the centerline.

12. The gas turbine engine of claim 11 wherein the impact surface is formed by a portion of the centerbody.

13. The gas turbine engine of claim 1 wherein the set of plenum inlets are spaced radially outward from an apex of the turn such that the set of plenum inlets are arranged about the apex of the turn along the engine centerline.

14. The gas turbine engine of claim 1 wherein the set of plenum inlets are annularly arranged about the apex of the turn.

15. A gas turbine engine comprising:
    an inlet having a centerbody defining a radially inward surface of an inlet duct defining an inlet airflow path;
    an engine core arranged downstream of the centerbody and defining an engine centerline;
    an inlet particle separator forming a turn about the radially inward surface of the centerbody and having a set of scavenge plenum inlets spaced along an axial segment defined by the turn, the set of scavenge plenum inlets being axially aligned and radially outward from an apex of the turn, the set of scavenge plenum inlets fluidly coupling the inlet duct to a scavenge plenum; and
    an impact surface formed by at least a portion of the centerbody located upstream of the turn.

16. The gas turbine engine of claim 15 wherein the turn is at least 120 degrees.

17. The gas turbine engine of claim 15 wherein the impact surface defines a forward angle of less than or equal to 90 degrees relative to the centerline.

18. The gas turbine engine of claim 15 wherein the inlet particle separator comprises scavenge vanes located with the set of scavenge plenum inlets.

19. The gas turbine engine of claim 15 wherein the inlet particle separator is mechanically removable from the inlet.

20. A gas turbine engine comprising:
    an inlet having a centerbody defining a radially inward surface of an inlet duct defining an inlet airflow path;
    an engine core arranged downstream of the centerbody and defining an engine centerline; and an inlet particle separator having a scavenge plenum arranged about at least a portion of the centerbody and having a set of plenum inlets fluidly coupling the inlet duct to the scavenge plenum;

wherein the inlet duct defines a turn about the radially inward surface of the centerbody, wherein the set of plenum inlets is axially aligned and radially outward from an apex of the turn such that the set of plenum inlets surrounds an upstream and downstream side of the apex of the turn along the engine centerline, and wherein the set of plenum inlets fluidly couple to the inlet duct at the turn.

* * * * *